(12) United States Patent
Dunjic et al.

(10) Patent No.: US 11,932,134 B2
(45) Date of Patent: *Mar. 19, 2024

(54) ELECTRIC VEHICLE CHARGER AND RELATED METHODS

(71) Applicant: The Toronto-Dominion Bank, Toronto (CA)

(72) Inventors: Milos Dunjic, Oakville (CA); Asad Joheb, Toronto (CA); Vipul Kishore Lalka, Oakville (CA); Ravivarma Raveenthran, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/082,069

(22) Filed: Dec. 15, 2022

(65) Prior Publication Data

US 2023/0113732 A1 Apr. 13, 2023

Related U.S. Application Data

(63) Continuation of application No. 16/425,021, filed on May 29, 2019, now Pat. No. 11,554,685.

(51) Int. Cl.
*B60L 53/66* (2019.01)
*G06Q 20/08* (2012.01)
(Continued)

(52) U.S. Cl.
CPC .......... *B60L 53/665* (2019.02); *G06Q 20/085* (2013.01); *G06Q 20/28* (2013.01);
(Continued)

(58) Field of Classification Search
CPC ..................................................... B60L 53/665
(Continued)

(56) References Cited

U.S. PATENT DOCUMENTS 7,885,893 B2 2/2011 Alexander
7,956,570 B2 6/2011 Lowenthal et al.
(Continued)

OTHER PUBLICATIONS

Pedersen, Anders Bro; Østergaard, Jacob; Poulsen, Bjarne; Gantenbein, Dieter; Electric Vehicle Integration in a Real-Time Market; DTU Library, Phd Thesis, Publication Date: May 2014, Denmark; http://orbit.dtu.dk/files/131864798/thesis_ABP.pdf.
(Continued)

*Primary Examiner* — Jerry D Robbins
(74) *Attorney, Agent, or Firm* — Rowand LLP

(57) ABSTRACT

An electric vehicle charger includes a power supply and a controller. The power supply is for supplying electric power over a charging connection to an electric vehicle. The charging connection employs charging conductors to supply electric power from the power supply to the electric vehicle for charging. The power supply is adapted to send data to and receive data from the electric vehicle over the charging conductors according to a power-line communications protocol. The controller coupled to the power supply to control supply of electric power to the electric vehicle, The controller is adapted to, prior to initiating supply of electric power by the power supply to the electric vehicle for charging, communicate with the electric vehicle to identify a payment method associated with the electric vehicle and with the payment network to authorize the payment method for payment for electric power supplied to the electric vehicle for charging.

20 Claims, 8 Drawing Sheets

(51) Int. Cl.
  *G06Q 20/28* (2012.01)
  *G06Q 20/38* (2012.01)
  *G06Q 50/30* (2012.01)
  *G07F 15/00* (2006.01)
  *H04L 9/08* (2006.01)
  *H04L 9/30* (2006.01)
  *H04L 9/32* (2006.01)

(52) U.S. Cl.
  CPC ......... *G06Q 20/3825* (2013.01); *G06Q 50/30* (2013.01); *G07F 15/005* (2013.01); *H04L 9/0825* (2013.01); *H04L 9/3073* (2013.01); *H04L 9/3247* (2013.01); *B60Y 2200/91* (2013.01); *B60Y 2300/91* (2013.01)

(58) Field of Classification Search
  USPC .......................................................... 705/13
  See application file for complete search history.

(56) References Cited

U.S. PATENT DOCUMENTS

| | | | |
|---|---|---|---|
| 8,415,918 B2 | 4/2013 | Tonegawa | |
| 8,536,826 B2 | 9/2013 | Matsuoka et al. | |
| 8,731,974 B2 | 5/2014 | Pandhi et al. | |
| 8,896,265 B2 | 11/2014 | Laberteaux | |
| 9,337,679 B2 | 5/2016 | Szostek et al. | |
| 9,436,944 B2 | 9/2016 | Turner | |
| 9,902,276 B2 | 2/2018 | Bianco et al. | |
| 11,170,446 B1 * | 11/2021 | Thurber | B60L 53/00 |
| 2009/0021213 A1 | 1/2009 | Johnson | |
| 2009/0287578 A1 | 11/2009 | Paluszek et al. | |
| 2011/0011930 A1 | 1/2011 | Starr et al. | |
| 2011/0066309 A1 * | 3/2011 | Matsuoka | B60L 50/64 |
| | | | 702/187 |
| 2011/0145141 A1 | 6/2011 | Blain | |
| 2011/0153474 A1 | 6/2011 | Tormey et al. | |
| 2013/0029595 A1 * | 1/2013 | Widmer | B60L 53/124 |
| | | | 455/39 |
| 2013/0041854 A1 | 2/2013 | Littrell | |
| 2014/0121878 A1 | 5/2014 | Pandhi et al. | |
| 2016/0084672 A1 * | 3/2016 | Daenuwy | B60L 53/14 |
| | | | 340/870.02 |
| 2017/0169648 A1 | 6/2017 | Penilla et al. | |
| 2017/0272250 A1 * | 9/2017 | Kaliski, Jr. | H04L 61/4511 |
| 2018/0056796 A1 | 3/2018 | Ferris | |
| 2019/0238000 A1 * | 8/2019 | Salvekar | H02J 50/80 |

OTHER PUBLICATIONS

A New Standard for Customer-Friendly and Connected Electric Mobility; Feb. 2017; https://www.hubject.com/wp-content/uploads/2017/02/Hubject_Publication_ISO15118.pdf.

New Electric Vehicle charging Station uses Machine-to-Machine Communication; Apr. 23, 2018; https://www.governmenteuropa.eu/ev-charging-machine-to-machine-communication/86769.

Rainer Falk and Steffen Fries (Corporate Technology, Siemens AG, Munich, Germany); Securely Connecting Electric Vehicles to the Smart Grid; International Journal on Advances in Internet Technology, vol. 6 No. 1 & 2, 2013; https://citeseerx.ist.psu.edu/viewdoc/summary?doi=10.1.1.683.7333.

Knox, Jon; Powering up for Electric Vehicles, Automotive Industries, Mar. 2011; http://www.ai-online.com/Adv/Previous/show_issue.php?id=4018.

Combined Charging System; https://en.wikipedia.org/wiki/Combined_Charging_System; Last edited on Apr. 28, 2019.

IEEE 1901; https://en.wikipedia.org/wiki/IEEE_1901; Last edited on Mar. 10, 2019.

SAE J1772; https://en.wikipedia.org/wiki/SAE_J1772; Last edited on Mar. 20, 2019.

* cited by examiner

ELECTRIC VEHICLE CHARGER AND RELATED METHODS

FIELD

This relates to electric vehicle chargers, and, more particularly, to processing payments related to an electric vehicle being charged.

BACKGROUND

Electric vehicles typically include an energy storage device such as, for example, a battery that can be used to power the vehicle. Such energy storage devices can be charged using external power sources. An electric vehicle charger is an external power source providing electric power.

Electric vehicles may be charged at a home location such as, for example, an owner's home. Electric vehicles may also be charged away from a home location such as, for example, in a commercial parking lot. In either case, it may be required to pay for the power supplied to the electric vehicle while charging. At home, the power may be included in metered power supplied to the home and may be included in a power bill for the home. Away from home, payment may be collected such as, for example, by way of a point-of-sale terminal associated with or integrated into a charger. For example, a user may be required to use a payment card (e.g., a credit or debit card) to prepay for power before charging or to pay for power after charging.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
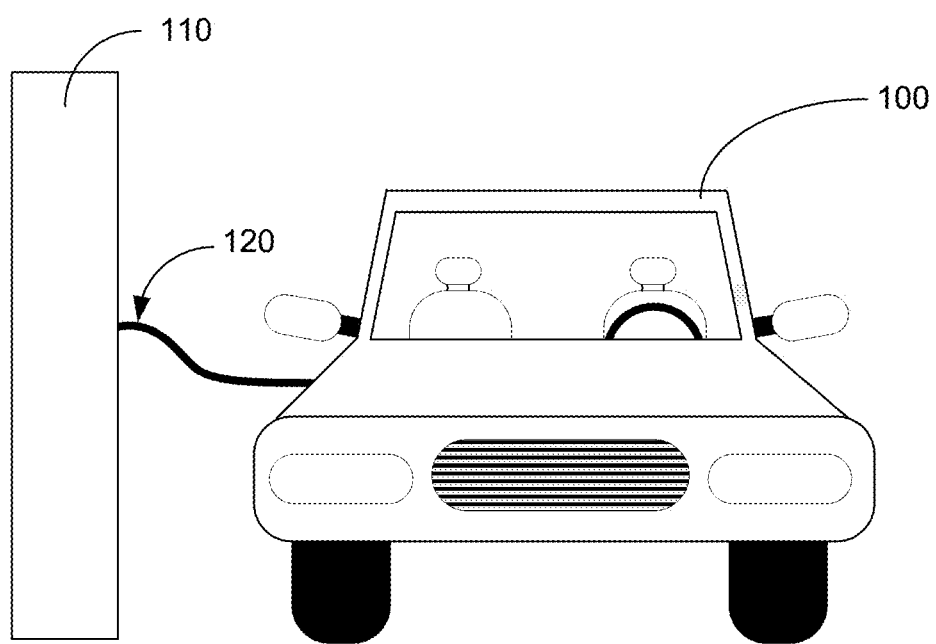
FIG. 1 shows an electric vehicle charger connected to an electric vehicle.

According to the subject matter of the present application, there may be provided an electric vehicle charger. The electric vehicle charger may include a power supply, a communications device, and a controller. The power supply may be for supplying electric power over a charging connection to an electric vehicle. The charging connection may employ one or more charging conductors to supply electric power from the power supply to the electric vehicle for charging. The power supply may be adapted to send data to and receive data from the electric vehicle over the one or more charging conductors according to a power-line communications protocol. The communication device may be for communicating with a payment network. The controller may be coupled to the communication device and/or coupled to the power supply to control supply of electric power to the electric vehicle. The controller may be adapted to, prior to initiating supply of electric power by the power supply to the electric vehicle for charging, communicate with the electric vehicle over the one or more charging conductors according to the power-line communications protocol to identify a payment method associated with the electric vehicle. The controller may further be adapted to communicate with the payment network using the communication device to authorize the payment method for payment for electric power supplied to the electric vehicle for charging.

In some implementations, the power supply may be adapted to supply a nominal level of electric power insufficient for charging the electric vehicle over at least one of the one or more charging conductors when electric power for charging the electric vehicle is not being supplied to the electric vehicle over the charging connection. The power supply may further be adapted to communicate over the at least one of the one or more charging conductors according to the power-line communications protocol while the nominal level of power is being supplied. It may be that communicating with the electric vehicle over the charging connection to identify the payment method associated with the electric vehicle includes: detecting, by the controller, that the charging connection has been established between the power supply and the electric vehicle; establishing, by the controller, supply of the nominal level of electric power insufficient for charging the electric vehicle over the at least one charging conductor; and communicating, using the power supply, with the electric vehicle over the at least one charging conductor according to the power-line communications protocol to identify the payment method associated with the electric vehicle.

In some implementations, it may be that the controller communicating with the electric vehicle over the charging connection to identify the payment method associated with the electric vehicle includes: receiving, from the electric vehicle over the charging connection, a first indication including a public key of an asymmetric cryptographic key pair associated with the payment method; generating a random number; sending, to the electric vehicle over the charging connection, a second indication including the random number; receiving, from the electric vehicle over the charging connection, a third indication including a payload and a digital signature for the payload, wherein the payload includes the random number and payment data, and wherein the digital signature is signed using a private key of the asymmetric cryptographic key pair associated with the payment method; and validating the signature of the payload using the public key. It may also be that communicating with the payment network to authorize the payment method for payment for the electric power supplied to the electric vehicle comprises communicating, based on the payment data, with the payment network using the communication device to authorize the payment method. It may be that the controller is further adapted to initiate the supply of electric power by the power supply to the electric vehicle for charging subsequent to authorizing the payment method for payment for the electric power.

In some implementations, authorizing the payment method for payment for electric power supplied to the electric vehicle may include obtaining an authorization to charge the payment method up to a pre-defined amount. It may be that the controller is further adapted to charge for supplied electric against the authorization.

In some implementations, it may be that data sent to and received from the electric vehicle over the one or more charging conductors includes one or more data packets.

In some implementations, sending data to and receiving data from the electric vehicle over the one or more charging conductors according to the power-line communications protocol may employ orthogonal frequency-division multiplexing to modulate the data.

In some implementations, the controller may be further adapted to communicate with the payment network using the communication device to authorize the payment method for payment for at least one additional product or service associated with a location of the electric vehicle charger. For example, it may be that the at least one additional product or service includes parking for the electric vehicle.

In some implementations, data exchanged with the electric vehicle over the at least one charging conductor may be packetized.

In some implementations, communicating with the electric vehicle to identify the payment method associated with the electric vehicle may include exchanging one or more messages with the electric vehicle. The messages may correspond to a payment messaging protocol.

According to the subject matter of the present application, there may be provided a method of charging an electric vehicle. The method may include: detecting that a charging connection has been established between an electric vehicle and an electric vehicle charger. The method may further include, by the electric vehicle charger, without initiating supply of electric power to the electric vehicle for charging: communicating with the electric vehicle over at least one charging conductor of the charging connection according to a power-line communications protocol to identify a payment method associated with the electric vehicle; and communicating, with a payment network, to authorize the payment method for payment for electric power supplied by the electric vehicle charger to the electric vehicle for charging. The method may further include, following authorization of payment using the payment method, initiating supply of electric power by the electric vehicle charger to the electric vehicle.

In some implementations, the method may further include establishing, by the electric vehicle charger, supply of a nominal level of electric power insufficient for charging the electric vehicle over the least one charging conductor to allow communication between the electric vehicle charger and the electric vehicle according to the power-line communications protocol prior to initiating supply of electric power for charging the electric vehicle.

It may be that communicating with the electric vehicle over the charging connection to identify the payment method associated with the electric vehicle includes: receiving, from the electric vehicle over the charging connection, a first indication including a public key of an asymmetric cryptographic key pair associated with the payment method; generating a random number; sending, to the electric vehicle over the charging connection, a second indication including the random number; receiving, from the electric vehicle over the charging connection, a third indication including a payload and a digital signature for the payload, wherein the payload includes the random number and payment data, and wherein the digital signature is signed using a private key of the asymmetric cryptographic key pair associated with the payment method; and validating the signature of the payload using the public key. It may be that communicating with the payment network to authorize the payment method for payment for supplied electric power includes: communicating, based on the payment data, with the payment network to authorize the payment method for supplied electric power. The method may further include subsequent to authorizing the payment method for payment for the electric power, initiating the supply of electric power by the power supply to the electric vehicle for charging.

In some implementations, authorizing the payment method for payment for electric power supplied to the electric vehicle may include obtaining an authorization to charge the payment method up to a pre-defined amount and wherein payment for the supplied electric power is processed against the authorization.

In some implementations, authorizing the payment method for payment for electric power supplied to the electric vehicle includes obtaining an authorization to charge the payment method for an incremental amount of power. Further, it may be that the method further includes, after supplying the incremental amount of power to the electric vehicle, communicating, with the payment network, to obtain a further authorization to charge the payment method for a further incremental amount of power. It may also be that the method further includes: communicating, with the payment network, to attempt to obtain a yet further authorization to charge the payment method for a yet further incremental amount of power; receiving an indication that the yet further authorization was declined by the payment network; and following receipt of the indication that the yet further authorization was declined by the payment network, terminating supply of electric power by the electric vehicle charger to the electric vehicle.

In some implementations, the method may further include communicating, by the electric vehicle charger, with the payment network to authorize the payment method for payment for at least one product or service associated with a location of the electric vehicle charger. For example, it may be that the at least one product or service includes parking for the electric vehicle.

According to the subject matter of the present application, there may be provided an electric vehicle. The electric vehicle may include an energy storage device, a power unit, and a computing device. The power unit may be for charging the energy storage device using electric power received over a charging connection from an electric vehicle charger. The power unit may be adapted to send data to and receive data from the electric vehicle charger over one or more charging conductors of a charging connection according to a power-line communications protocol while a nominal level of electric power insufficient for charging the electric vehicle is being supplied to the electric vehicle of the one or more charging conductors. The computing device may be coupled to the power unit. The computing device may be adapted to communicate with the electric vehicle charger over the one or more charging conductors using the power unit to authorize a payment method associated with the electric vehicle for payment for electric power supplied to the electric vehicle by the electric vehicle charger for charging. The computing device may be in communication with a secure element storing information associated with the payment method associated with the electric vehicle.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Referring to FIG. 1, an electric vehicle charger 100 is connected to an electric vehicle 110 by way of a charging connection 120.

Connecting the electric vehicle charger 100 to the electric vehicle 110 allows the electric vehicle charger 100 to be used to charge the electric vehicle 110.

The electric vehicle charger 100 supplies power to the electric vehicle 110 for charging. As further described below, the electric vehicle charger 100 may condition the supply of charging power to the electric vehicle 110 on authorizing a payment method for payment for the supplied power.

The electric vehicle 110 may include an electric drive system including, for example, one or more electric motors, for propelling the electric vehicle 110 using stored electric power.

The charging connection 120 is a connection between the electric vehicle charger 100 and the electric vehicle 110 for supplying electric power from the electric vehicle charger 100 to the electric vehicle 110. More particularly, the charging connection 120 may involve a charging cable or some other electrical connection between the electric vehicle charger 100 and the electric vehicle 110. The charging connection 120 may employ one or more than one charging conductor to supply electric power from the electric vehicle charger 100 to the electric vehicle 110 for charging. As further described below, data may also be sent and received over the one or more charging connectors of the charging connection 120. For example, data may be exchanged over the one or more charging connectors of the charging connection 120 to identify a payment method that can then be authorized for payment for the electric power supplied to the electric vehicle for charging as further described below.

Figure 2:
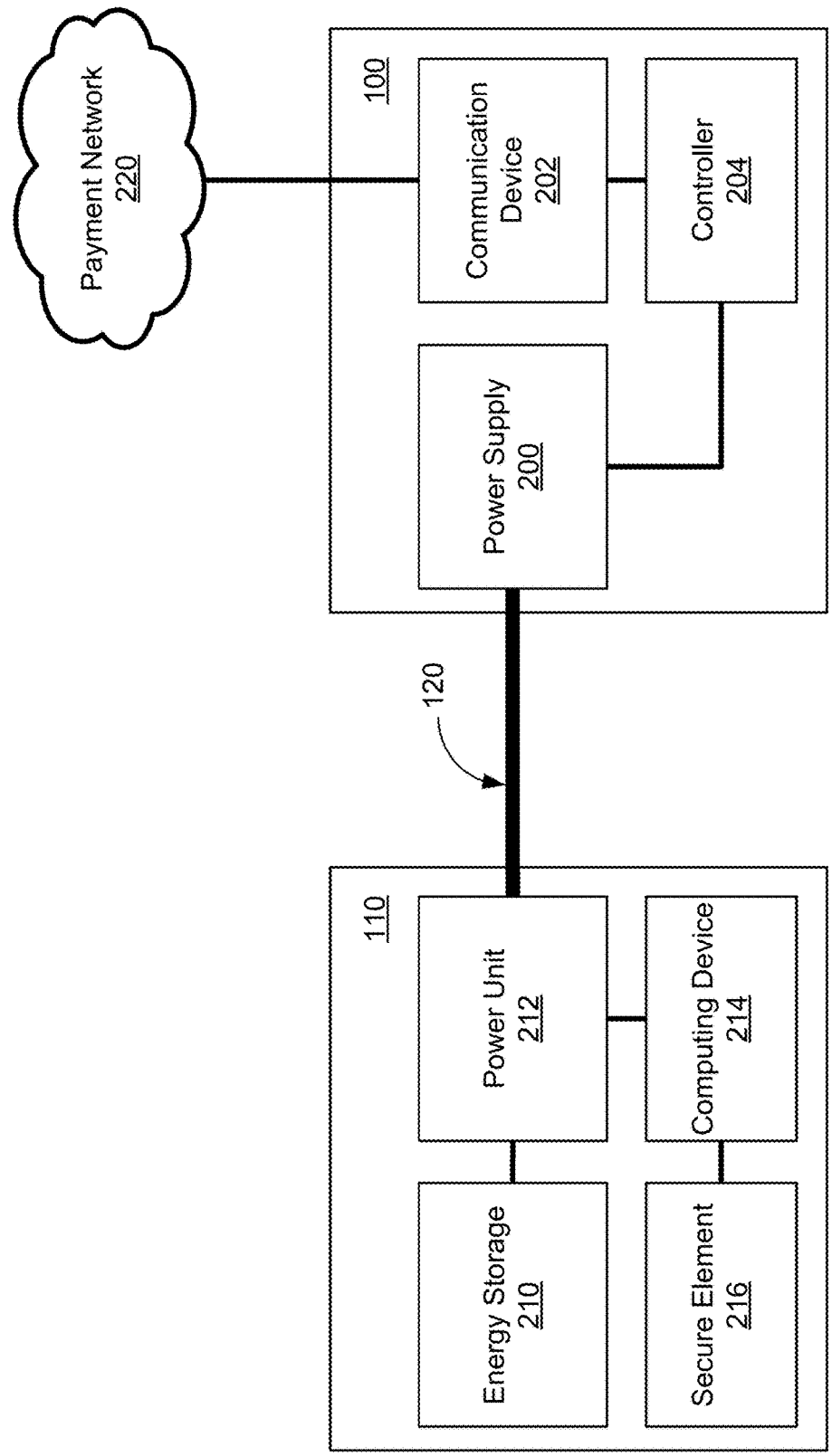
FIG. 2 is a simplified schematic showing components of the electric vehicle charger and the electric vehicle of FIG. 1.

Components of the electric vehicle charger 100 and the electric vehicle 110 will now be discussed with reference to FIG. 2 which provides a simplified schematic diagram of each of the electric vehicle charger 100 and the electric vehicle 110.

As further described below, coupling between various components of each of the electric vehicle charger 100 and the electric vehicle 110 is illustrated with a connecting line therebetween.

The electric vehicle charger 100 may include a variety of components. For example, as illustrated, the electric vehicle charger 100 may include a power supply 200, a communication device 202, and a controller 204.

The power supply 200 is the component of the electric vehicle charger 100 that supplies the electric power over the charging connection 120 to the electric vehicle 110 for charging. The power supply 200 may, as illustrated, be selectively coupled to the charging connection 120. As mentioned above, the charging connection 120 uses one or more charging conductors to supply electric power from the electric vehicle 110 for charging. That power may be supplied by the power supply 200. As further described below, the power supply 200 is also adapted to send data to and receive data from the electric vehicle 110 over one or more charging conductors of the charging connection 120. The data may be sent to and received from the electric vehicle 110 by the power supply 200 according to a power-line communications protocol. For example, as further described below, data may be sent to and/or received from the electric vehicle 110 by the electric vehicle charger 100 using the power supply 200 in order to identify a payment method for payment for electric power supplied to the electric vehicle 110 by the electric vehicle charger 100 for charging.

The communication device 202 allows the electric vehicle charger 100 to communicate with one or more networks. For example, the communication device 202 may, as illustrated, be employed for communicating with a payment network 220 such as, for example, to authorize and/or charge a payment method such as for payment for electric power supplied to the electric vehicle 110 by the electric vehicle charger 100 for charging.

The controller 204 is a computing device. The controller 204 controls the overall operation of the electric vehicle 110. For example, the controller 204, may control the supply of electric power to the electric vehicle 110. More particularly, the controller 204 may be coupled to the power supply 200 to control the supply of electric power to the electric vehicle 110 by the power supply 200 over the one or more charging conductors of the charging connection 120. The controller 204 may also be coupled to the communication device 202. As further described below, the controller 204 may, prior to initiating supply of electric power by the power supply 200 to the electric vehicle 110 for charging, communicate with the electric vehicle 110 over the one or more charging conductors of the charging connection 120 in order to identify a payment method associated with the electric vehicle 110. The controller 204 may then communicate with a corresponding payment network (e.g., the payment network 220) using the communication device 202 to authorize that payment method for use in providing payment for the electric power supplied by the electric vehicle 110 and, more particularly, by the power supply 200, to the electric vehicle 110 for charging.

The electric vehicle 110 also includes various components. For example, as illustrated the electric vehicle 110 may include an energy storage device 210, a power unit 212, a computing device 214. Additionally, in some implementations, the electric vehicle 110 may include a secure element 216.

The energy storage device 210 stores electrical energy for future use by the electric vehicle 110. The energy storage device 210 may include one or more energy storage elements such as, for example, one or more batteries, supercapacitors, or the like. Energy from the energy storage device 210 may be used to power one or more components of the electric vehicle 110 such as, for example, a drive system (not shown) of the electric vehicle 110. The energy storage device 210 may be coupled to the power unit 212.

The power unit 212 can, as illustrated, be selectively coupled to the charging connection 120. The power unit 212 can charge the energy storage device 210 using electric power received over the charging connection 120 from the electric vehicle charger 100. Further, the power unit 212 may, analogous to the power supply 200, send and receive data to/from the electric vehicle 110 over one or more charging conductors of the charging connection 120. More particularly, such data may, as mentioned above, be sent and received according to a power-line communications protocol as discussed above and further described below. As mentioned above, the power unit 212 may be coupled to the energy storage device 210. The power unit 212 may also be coupled to the computing device 214.

The computing device 214 may cause the electric vehicle 110 to perform one or more operations. For example, the computing device 214 may control the charging of the electric vehicle 110. The computing device 214 may use the power unit 212 to communicate with the electric vehicle charger 100 to authorize a payment method associated with the electric vehicle 110 for payment for electric power supplied to the electric vehicle 110 by the electric vehicle charger 100 for charging as discussed above and further described below.

The secure element 216 provides secure storage for data such as, for example, payment related information such as, for example, credentials or the like. The computing device 214 and the secure element 216 may be in communication with each other.

As mentioned above, the power supply 200 and the power unit 212 may each be selectively coupled to the charging connection 120. In effect, the electric vehicle charger 100 may be selectively coupled to the electric vehicle 110 (and, more particularly, the power supply 200 may be selectively coupled to the power unit 212), thereby defining the charging connection 120. In order to allow for this selective coupling, a removable connector may be employed at one or both ends of a cable providing the charging connection 120. Such a connector may include one or more pins. Each such pin may be coupled to one or more conductors forming a part of the charging connection 120. For example, a given pin of a connector may be coupled to one of the charging conductors of the charging connection 120.

Figure 3:
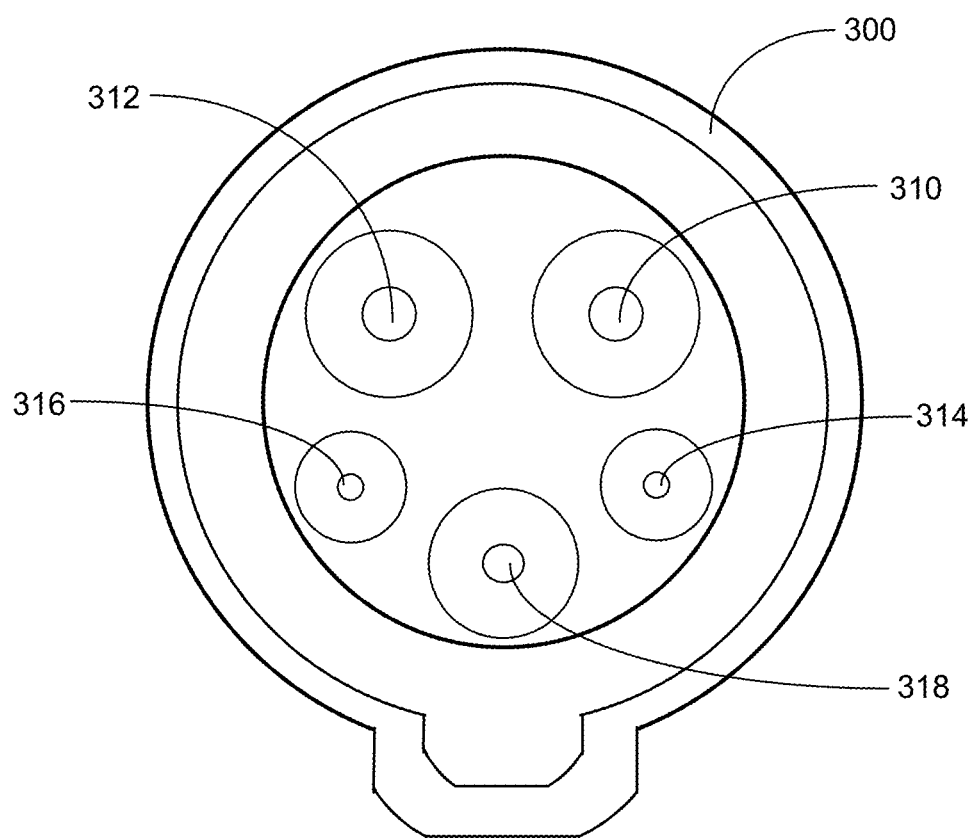
FIG. 3 shows an example connector such as may be employed in establishing a charging connection between the electric vehicle charger and the electric vehicle of FIG. 1.

Example connectors such as may be employed to allow selective coupling as discussed above include IEC (International Electrotechnical Commission) Type 1/SAE J1772 (sometimes also known as a "J" plug), IEC 62196 Type 2 (sometimes referred to as "mennekes"), Combined Charging System, CHAdeMO™, and the proprietary Tesla™ Supercharger™ connector. An example of such as connector as may be employed in establishing the charging connection 120 will now be discussed with reference to FIG. 3 which shows a connector 300.

The connector 300 is an SAE J1772 connector. The connector 300 has 5 pins: an L1 pin 310, an L2/neutral pin 312, a proximity detection pin 314, a control pilot pin 316, and chassis ground pin 318. The role of each of the pins will be discussed below briefly. Greater detail on the SAE J1772 connector is found in the relevant SAE standard, "SAE Electric Vehicle and Plug in Hybrid Electric Vehicle Conductive Charge Coupler", J1772_201710, dated Oct. 13, 2017 (available from SAE), the contents of which are herein incorporated by reference in their entirety.

The control pilot pin 316 carries communication signals used to signal charging level between a vehicle such as, for example, the electric vehicle 110 and electric vehicle supply equipment (EVSE) such as, for example, the electric vehicle charger 100. A 1 kHz square wave may be generated by the EVSE and may be signalled via a conductor connected to the control pilot pin 316. The duty cycle of that wave may be determined based on the maximum available current from the EVSE. Vehicle side, that same conductor may be connected to circuitry that will adjust the voltage of the positive portion of the square wave, thereby allowing the vehicle to signal different charging states.

The proximity detection pin 314 may be in communication with a release button (not shown) on the connector 300. The proximity detection pin 314 may be used to signal that the release button has been pressed so that charging current may be ceased (e.g., for safety) in anticipation of the connector being disconnected.

The L1 pin 310 and the L2/neutral pin 312 are a pair of charging connectors used to carry charging current from an EVSE to an electric vehicle. Where the L1 pin 310 and the L2/neutral pin 312 are used to carry alternating charging current (AC charging current) from an EVSE to an electric vehicle, the L1 pin 310 may be in electrical communication with a hot wire of an alternating current (AC) power source and the L2/neutral pin 312 may be in electrical communication with a neutral wire of an AC power source.

The chassis ground pin 318 may be in electrical communication with an earth ground.

As mentioned above, the controller 204 and the computing device 214 are each computing devices. An example computing device, instances of which may be employed as either or both of the controller 204 and the computing device 214, will now be discussed with reference to FIG. 4.

Figure 4:
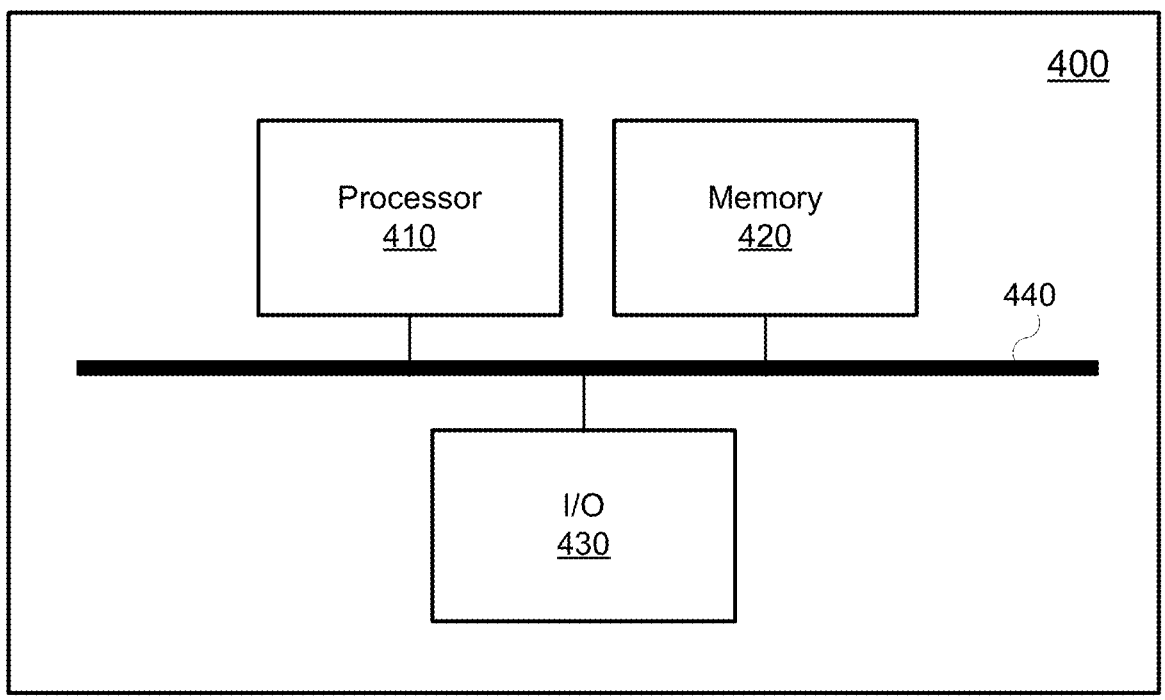
FIG. 4 is a high-level block diagram of an example computing device.

FIG. 4 is a high-level operation diagram of an example computing device 400. In some embodiments, as mentioned above, the example computing device 400 may be exemplary of the controller 204 and/or the computing device 214. As will be discussed in greater detail below, the controller 204 and/or the computing device 214 may include software to adapt that/those computing device(s) to perform a particular function(s). More particularly, software of the controller 204 may adapt the controller 204 to control the overall operation of the electric vehicle 110. Additionally or alternatively, software of the computing device 214 may adapt the electric vehicle 110 to perform operations as mentioned above such as, for example, controlling the charging thereof.

The example computing device 400 includes a variety of modules. For example, as illustrated, the example computing device 400 may include a processor 410, a memory 420, and an input/output (I/O) module 430. As illustrated, the foregoing example modules of the example computing device 400 are in communication over a bus 440.

The processor 410 is a hardware processor. The processor 410 includes at least one physical processor and at least one core, but may also include more than one physical processor and/or more than one processor core. For example, the processor 410 may, for example, be one or more ARM, Intel x86, PowerPC processors or the like.

The memory 420 allows data to be stored and retrieved. The memory 420 may include, for example, random access memory, read-only memory, and persistent storage. Persistent storage may be, for example, flash memory, a solid-state drive or the like. Read-only memory and persistent storage are each a non-transitory computer-readable storage medium. A computer-readable medium may be organized using a file system such as may be administered by an operating system governing overall operation of the example computing device 400.

The I/O module 430 allows the example computing device 400 to interact with devices such as, for example, peripherals to send and receive data. The I/O module 430 may, for example, allow the example computing device 400 to interface with input devices such as, for example, keypads, keyboards, pointing devices, and the like. In another example, the I/O module 430 may, for example, allow the example computing device 400 to interface with output devices such as, for example, displays, printers, and the like. In a particular example, where an instance of the example computing device 400 is employed as or as a part of the controller 204, the I/O module 430 may be employed to interface and communicate with one or both of the power supply 200 and the communication device 202. In another example, where an instance of the example computing device 400 is employed as or as a part of the computing device 214, the I/O module 430 may be employed to interface and communicate with one or both of the power unit 212 and the secure element 216.

Software comprising instructions is executed by the processor 410 from a computer-readable medium. For example, software may be loaded into random-access memory from persistent storage of the memory 420. Additionally or alternatively, instructions may be executed by the processor 410 directly from read-only memory of the memory 420.

As mentioned, the example computing device 400 is discussed above by way of example. Other computing devices may, additionally or alternatively, be employed in providing one or both of the controller 204 and the computing device 214. For example, another computing device may be employed incorporating one or more modules different from modules of the example computing device 400. In a particular example, some computing devices may incorporate a secure storage module allowing such a device to act as both the computing device 214 and the secure element 216 of the electric vehicle 110.

As briefly discussed above, the electric vehicle charger 100 may initiate supply of electric power for charging the electric vehicle 110 subsequent to authorizing the payment method for payment for the electric power. Operations as may be performed by the electric vehicle charger 100 in initiating supply of power to the electric vehicle 110 for charging will now be discussed with reference to FIG. 5.

Figure 5:
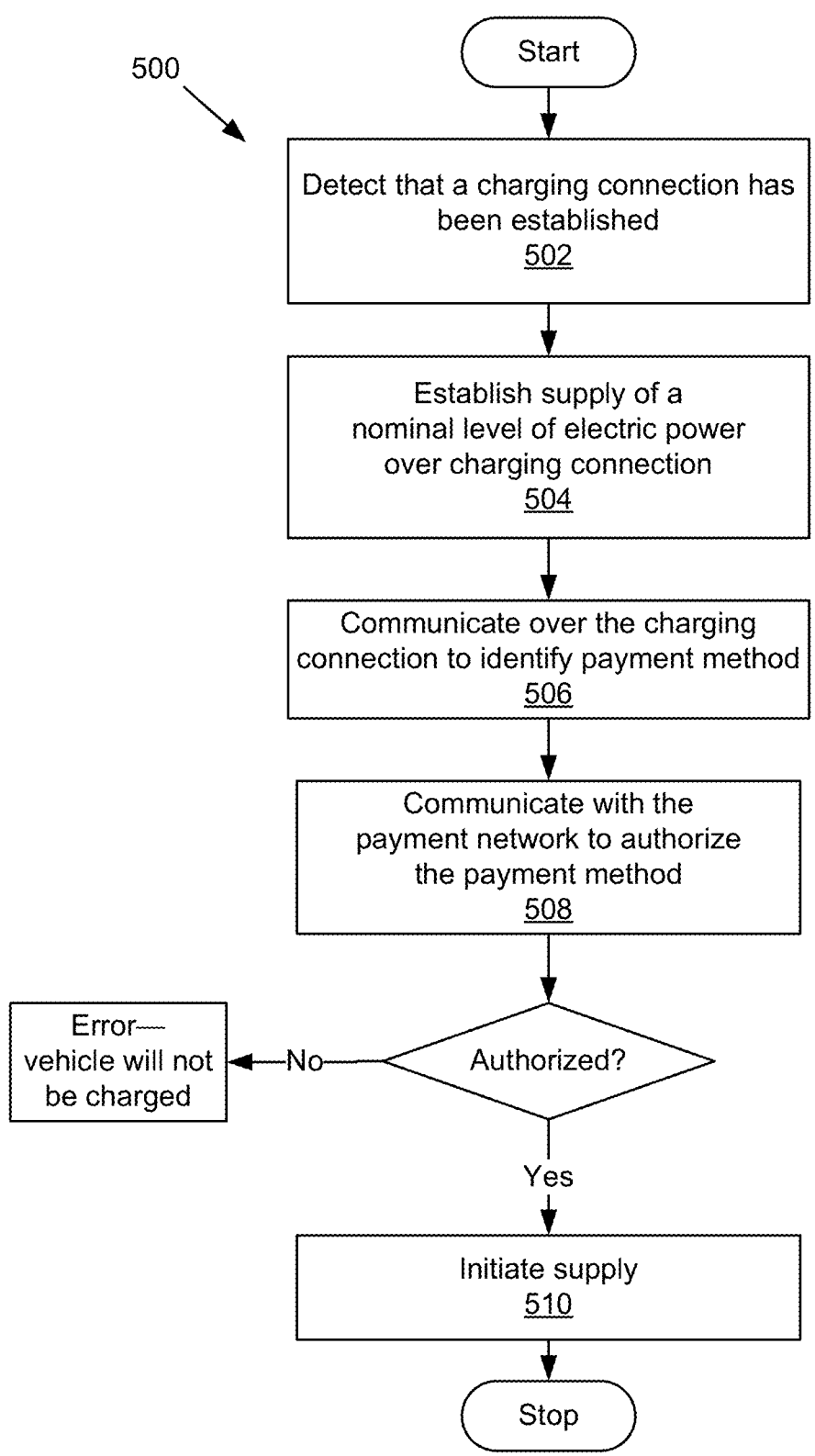
FIG. 5 provides a flowchart depicting example operations performed by the electric vehicle charger of FIG. 1 in initiating supply of power to the electric vehicle of FIG. 1 for charging.

FIG. 5 provides a flowchart depicting example operations performed in a method 500 of initiating supply of power subsequent to authorizing a payment method for payment for the power. Operations starting with an operation 502 and continuing onward are performed by one or more processors of one or more computing devices, such as, for example, the processor 410 (FIG. 4) of one or more suitably configured instances of the example computing device 400 (FIG. 4), executing software comprising instructions. In a particular example, one or more of the operations may be performed by a processor of the controller 204 of the electric vehicle charger 100.

At the operation 502, the electric vehicle charger 100 detects that the charging connection 120 has been established between the electric vehicle charger 100 and the electric vehicle 110. The charging connection 120 may be detected by the power supply 200 and/or by the controller 204. In detecting the charging connection 120, the controller 204 and the power supply 200 may act in co-operation. In a particular example, where signalling such as that discussed with reference to the connector 300 (FIG. 3) above is employed, establishment of the charging connection 120 may be detected based on signalling between the electric vehicle charger 100 and the electric vehicle 110 such as that discussed above regarding the control pilot pin 316.

Following detection that the charging connection 120 has been established, an operation 504 is next.

As mentioned above, communication between the electric vehicle charger 100 and the electric vehicle 110 such as, for example, to identify a payment method, may employ a power line communication protocol. Power line communication protocols allow communication to occur over electric power lines such as may transmit power without disturbing the transmission of the power. As such, power line communication allows data to be transmitted by power lines without impairing the use of those conductors for power transmission. Power line communication can be contrasted with communication methods employing dedicated data conductors. Dedicated data conductors typically carry much lower levels of current and/or voltage as compared to power conductors such as may be employed for power line communication—e.g. milliamperes versus many Amperes and/or 5 to 12 V versus hundreds of Volts.

Institute of Electrical and Electronics Engineers (IEEE) Standard 1901 (IEEE 1901) is an example of a power line communication protocol such as may be employed for communicating between the electric vehicle charger 100 and electric vehicle 110 via the charging connection 120. By way of overview, IEEE 1901 is a standard defining how signalling may occur over electric power lines. IEEE 1901 defines physical layer signalling options including one based on fast Fourier transform (FFT) orthogonal frequency-division multiplexing (OFDM) modulation and another based on wavelet OFDM modulation. In other words, the IEEE 1901 power-line communications protocol employs OFDM for modulating/encoding data. IEEE 1901 may provide for high speed (up to 500 Mbits/sec) communication between the electric vehicle charger 100 and the electric vehicle 110. IEEE 1901 is described in greater detail in IEEE 1901.1-2018 entitled "IEEE Standard for Medium Frequency (less than 12 MHz) Power Line Communications for Smart Grid Applications" dated May 14, 2018, the contents of which are herein incorporated by reference in their entirety.

It may be that, in order to communicate over a given conductor and/or set (e.g., pair) of conductors, it is required that power is being conveyed via that/those conductors. However, as mentioned above, the electric vehicle charger 100 may only initiate supply of electric power for charging the electric vehicle 110 subsequent to authorizing a payment method to cover the cost of that power. According to the subject matter of the present application, use of a power line communication protocol prior to initiation of supply of electric power for charging the electric vehicle 110 by the electric vehicle charger 100 may be addressed by supplying power prior to so authorizing the payment method, but at a nominal level insufficient to allow for any substantial charging of the electric vehicle 110. This power may be supplied by the electric vehicle charger 100 such as, for example by the power supply 200. For example, this may entail the electric vehicle charger 100 supplying power of a limited voltage and/or current such as to prevent use of such power for charging the electric vehicle 110 (e.g., such as is incompatible with the charging requirements of the energy storage device 210 (FIG. 2)) and/or at levels that, even if some charging may occur, it would be at such a low-rate that to fully charge the electric vehicle 110 would take a long time (e.g., many days). For example, it may be that the nominal power is supplied at a level that the charge time for the electric vehicle 110 would be at least three times or at least five times as long as if charging power was being supplied thereto.

At the operation 504, a supply of a nominal level of electric power is established over the charging connection 120 by the electric vehicle charger 100. In other words, supply of a nominal level of electric power insufficient for charging the electric vehicle 110 over at least one charging conductor to allow communication between the electric vehicle charger 100 and the electric vehicle 110 such as, for example, communication according to a power-line communications protocol. The power supply 200 may be adapted to, potentially selectively, supply a nominal level of electric power insufficient for charging the electric vehicle over at least one charging conductor of the charging connection 120 when electric power for charging the electric vehicle 110 is not being supplied to the electric vehicle 110 of the charging connection 120. Accordingly, the supply of the nominal level of electric power may be established by the power supply 200. The supply of the nominal level of electric power may also be viewed as being established by the controller 204. For example, the controller 204 may communicate with and/or control the power supply 200 in order to cause the power supply 200 to supply the nominal level of electric power to the electric vehicle 110.

Following establishment of the nominal supply of electric power at the operation 504, an operation 506 is next.

At the operation 506, the electric vehicle charger 100 communicates with the electric vehicle 110 over one or more charging conductors to identify a payment method associated with the electric vehicle 110 that can be used to pay for power supplied to the electric vehicle 110 by the electric vehicle charger 100 for charging. This communication may employ a power-line communications protocol as discussed above. For example, communication may occur according to IEEE 1901. The communication by the electric vehicle charger 100 may be performed under the control of the controller 204 of the electric vehicle charger 100. Communication by the electric vehicle charger 100 with the electric vehicle 110 may use the power supply 200. For example, the controller 204 may use the power supply 200 to communicate with the electric vehicle 110 over the charging connection 120 using a power-line communications protocol to identify a payment method associated with the electric vehicle 110. On the other end of the charging connection 120, the electric vehicle 110 may communicate with the electric vehicle charger 100 under control of the computing device 214. For example, the computing device 214 may use the power unit 212 to communicate with the electric vehicle charger 100 over the charging connection 120 using a power-line communications protocol to identify a payment method associated with the electric vehicle 110.

Identification of a payment method may take a variety of forms as further discussed below. For example, it could be that the electric vehicle 110 sends one or more values identifying the payment method to the electric vehicle charger 100. Such a value may include, for example, a token and/or some value identifying the electric vehicle 110. In a particular example, such values may include a vehicle identification number (VIN) for the electric vehicle 110.

Following the communicating over the charging connection to identify a payment method at the operation 506, an operation 508 is next.

At the operation 508, the payment method identified at the operation 506 is authorized for payment for electric power supplied by the electric vehicle charger 100 to the electric vehicle 110 for charging. For example, the payment method may be authorized to determine whether it can cover the anticipated cost of a defined amount of electric power. In other words, the authorizing the identified payment method for payment for electric power supplied to the electric vehicle 110 may include obtaining an authorization to charge the payment method up to a pre-defined amount. The authorization may be obtained by communicating with the payment network 220. For example, the controller 204 may use the communication device 202 to communicate with the payment network 220 to authorize the payment method for payment for electric power to be supplied to the electric vehicle 110. Notably, where a token or other value(s) (e.g., as may have been obtained at the operation 506) are employed in authorizing, the payment network 220 may map such values/token to a payment method on the backend. For example, where a VIN is supplied identifying the electric vehicle 110, it may be mapped to a registered payment method (e.g., an account number such as, for example, a credit card number) associated with the electric vehicle 110.

Authorization may take a variety of forms. For example, authorization may be obtained up to a maximum expected amount of charges. For example, there may be a defined amount associated with the electric vehicle charger 100 that is used for the authorization. In another example, the authorization may be an amount determined based on characteristics of the electric vehicle 110 such as, may, for example, be received from the electric vehicle 110. Such characteristics may be communicated by the electric vehicle 110 to the electric vehicle charger 100 over the charging connection 120 such as, for example, according to a power-line communications protocol. The characteristics could include, for example, information about the energy storage device 210 (FIG. 2) such as its capacity and/or charge level. An authorization amount may be determined based on received characteristics. For example, an authorization may be sought for the amount of energy required to fully charge the energy storage device 210 or to charge the energy storage device 210 to a defined or selected charge level (e.g., to 50% or 80%) and/or to charge the energy storage device 210 by a defined or selected amount (e.g., add 10% or 20% to the charge level).

Notably, after authorization, payment for electric power may be obtained. For example, the authorization may be employed during such charging by charging the payment method against (e.g., referencing) the earlier authorization as power is consumed. In other words, payment for supplied electric power may be processed against the authorization. The payment method may be charged after charging completes and/or during charging such as, for example, periodically (e.g., after a defined time interval elapses and/or after as particular amounts of uncharged-for power is accrued). The payment method may be charged under the control of the controller 204. For example, the controller 204 may communicate with the payment network 220 such as, for example, using the communication device 202 to charge the payment method. The controller 204 may charge for electric power supplied to the electric vehicle 110 against that authorization.

Following the communication at the operation 508, if the payment method was successfully authorized, an operation 510 is next. Alternatively, if the payment method was not successfully authorized, then the electric vehicle 110 will not charge as no payment method that can be used to pay for the electric power consumed during charging has been identified. It may be that all connection and/or communication between the electric vehicle charger 100 and the electric vehicle 110 is terminated by the electric vehicle charger 100 responsive to such an error condition. For example, it could be that even the nominal supply established at the operation 504 is terminated.

At the operation 510, subsequent to authorizing the payment method for payment for electric power to be supplied to the electric vehicle 110 by the electric vehicle charger 100 for charging, a supply of electric power to the electric vehicle 110 for charging is initiated. For example, a supply by the power supply 200 over the charging connection 120 may be initiated such as, for example, under control of the controller 204.

Following the initiation of supply of power by the electric vehicle charger 100 to the electric vehicle 110, the identified payment method may be charged as discussed above. Further, in some cases, it may be that additional authorizations are obtained periodically. For example, where the authorization obtained at the operation 508 is exceeded, another authorization may be sought. In a particular example, an authorization may be periodically obtained for incremental amounts of electric power as authorizations are consumed, with charging being permitted to continue until interrupted by a user, until an authorization may not be obtained, and/or until the electric vehicle 110 is done charging (e.g., the energy storage device 210 is fully charged). Put a different way, authorizing the payment method for payment for electric power supplied to the electric vehicle 110 may include obtaining an authorization to charge a payment method for an incremental amount of power. Further, after such an incremental amount of power is supplied to the electric vehicle 110, a further authorization may be obtained to charge the payment method (or another payment method) for a further incremental amount of power. For example, it may be that, after supplying the incremental amount of power to the electric vehicle 110, the electric vehicle charger 100 may communicate with a payment network (e.g., the payment network 220) such as, for example, using the communication device 202, with the communication being in order to obtain the further authorization. Furthermore, where such a further authorization is not obtained, the supply of electric power to the electric vehicle 110 by the electric vehicle charger 100 may be terminated. For example, the electric vehicle charger 100 may communicate with a payment network as discussed above to attempt to obtain a further authorization to charge a payment method for another incremental amount of power. If an indication is received declining such a further authorization (e.g., declined by the payment network) then, following receipt of the indication, supply of electric power may be terminated.

Manners of identifying and authorizing payment methods may vary based on the particulars of the payment methods. An example of how a payment method may be identified and authorized will now be discussed with reference to FIG. 6.

Figure 6:
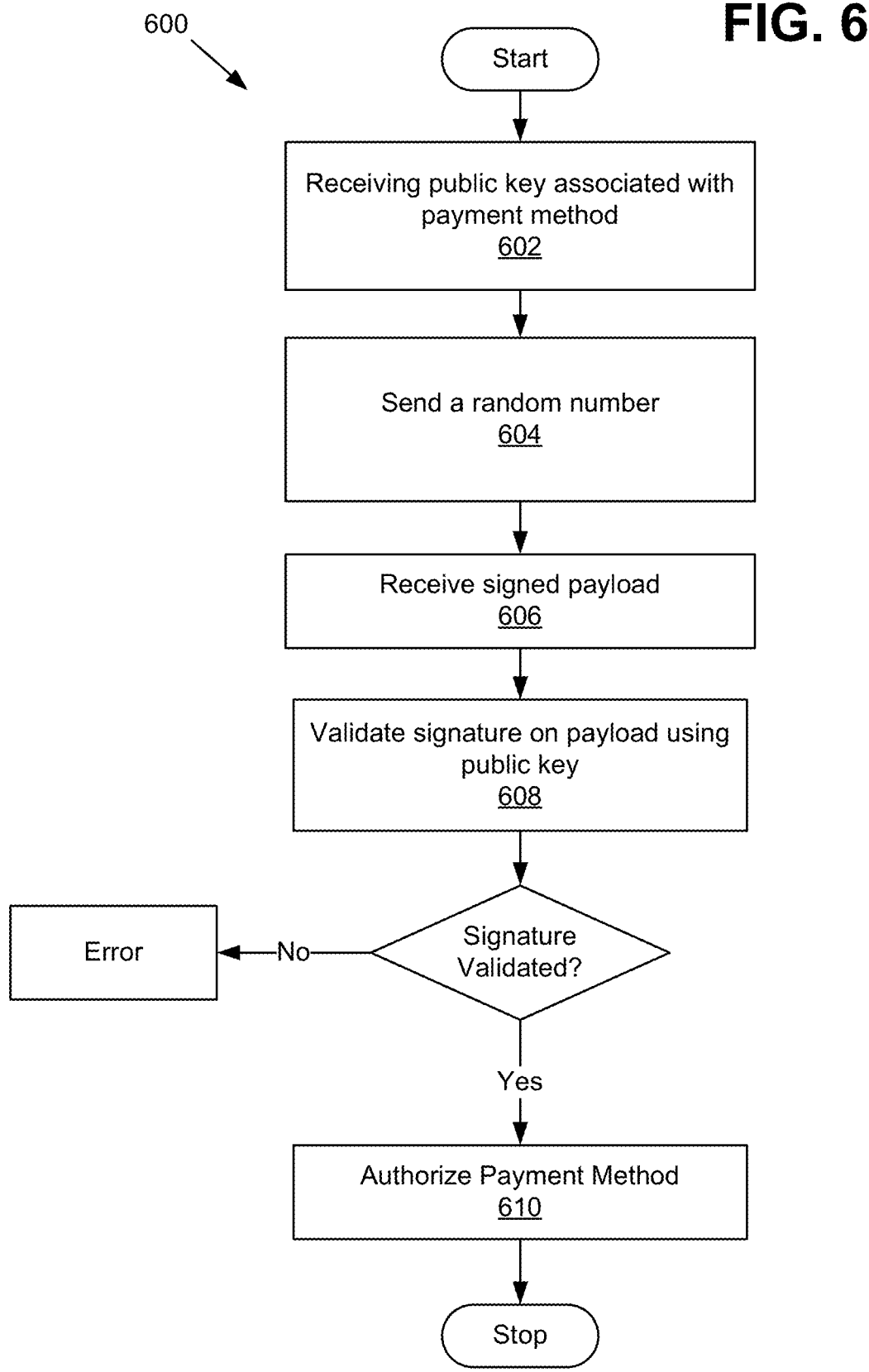
FIG. 6 provides a flowchart depicting example operations performed by the electric vehicle charger of FIG. 1 in identifying and authorizing a payment method.

FIG. 6 provides a flowchart depicting example operations of a method 600 as may be performed by the electric vehicle charger 100 in identifying and authorizing a payment method. Notably the method 600 may correspond to the operation 508 of the method 500 (in whole or in part). Operations starting with an operation 602 and continuing onward are performed by one or more processors of one or more computing device, such as, for example, the processor 410 (FIG. 4) of one or more suitably configured instances of the example computing device 400 (FIG. 4), executing software comprising instructions. In a particular example, one or more of the operations may be performed by a processor of the controller 204 of the electric vehicle charger 100. Notably, as further discussed below, corresponding operations may be performed by the electric vehicle 110 such as, for example, operations to generate and/or obtain and send values received by the electric vehicle charger 100. Such corresponding operations may be performed by a processor of the computing device 214 of the electric vehicle 110.

First at the operation 602, a public key associated with a payment method associated with the electric vehicle 110 may be received from the electric vehicle 110. The public key may be received by the electric vehicle charger 100 using the power supply 200 over the charging connection 120 such as, for example, using a power-line communications protocol. The public key may be received as a part of an indication that includes the public key.

The public key is the public key of an asymmetric cryptographic key pair (also known as public-private key pair). The key pair is associated with a payment method associated with the electric vehicle 110. In some cases, the key pair may directly correspond to the payment method. In other cases, the key pair may be derived from keys corresponding to the payment method. For example, the key pair may be a session key pair.

Notably the public key may be sent by the electric vehicle 110 based on material retrieved from the secure element 216. For example, the secure element 216 may store information associated with one or more payment methods associated with the electric vehicle 110 and it may be that this information includes or can be used to derive the public key.

Following the receipt of the public key at the operation 602, an operation 604 is next.

At the operation 604, a random number is generated by the electric vehicle charger 100. The random number may be generated by and/or under the control of the controller 204. The random number may be a cryptographically secure random number. The random number is sent to the electric vehicle 110 over the charging connection 120. For example, an indication including the random number may be sent to electric vehicle 110 over the charging connection 120. The random number and/or the indication may, for example, be sent under the control of the controller 204 using the communication device 202 such as, for example, using a power-line communications protocol.

Following the operation 604, an operation 606 is next.

At the operation 606, a signed payload is received from the electric vehicle 110 over the charging connection 120. For example, it may be that the payload and a digital signature for the payload (e.g., as a part of a received indication including both) is received under control of the controller 204 using the communication device 202 such as, for example, using a power-line communications protocol.

The payload includes the random number sent at the operation 604 (allowing the electric vehicle charger 100 to validate that it corresponds) as well as payment data associated with the payment method. For example, the payment data may be a token that can be used to authorize and/or charge the payment method. In a particular example, the token may be a value associated with the electric vehicle 110 such as, for example, a vehicle identification number (VIN).

The digital signature for payload is generated by signing using a private key corresponding to the public key received at the operation 602. In other words, the digital signature is signed using a private key of an asymmetric cryptographic key pair associated with the payment method, that keypair also including the previously-received public key (received at the operation 602). Notably, since the signature is generated using a private key of a key pair, it may be validated using the corresponding public key, namely the public key received at the operation 602.

The payload and the digital signature may be generated by the electric vehicle 110 based on the random number and on information associated with the keypair including a private key associated with the payment method as discussed above. For example, it may be that the computing device 214 generates the payload and/or the digital signature such as, for example, based on information retrieved from or derived from information retrieved from the secure element 216.

Notably, the payload received at the operation 606 may have been generated and sent by the electric vehicle 110 to the electric vehicle charger 100 responsive to receiving the random number sent at the operation 604. For example, the computing device 214 may generate the payload responsive to receiving the random number using the power unit 212.

Following the operation 606, an operation 608 is next.

At the operation 608, the electric vehicle 110 validates the signature on the payload received at the operation 606 using the public key received at the operation 602. The electric vehicle 110 may confirm that the signature corresponds to the payload. Additionally or alternatively, the electric vehicle 110 may confirm that the signature was generated using a private key corresponding to the previously-received public key. Furthermore, the electric vehicle 110 may confirm that the random number included in the payload is the random number that was sent to the electric vehicle 110 by the electric vehicle charger 100 at the operation 604.

If the signature validation checks are successful, an operation 610 follows the operation 608. If one or more the checks fails, an error condition has occurred. If an error condition occurs, all connection and/or communication between the electric vehicle charger 100 and the electric vehicle 110 may be terminated by the electric vehicle charger 100 responsive to such an error condition. For example, it could be that any supply of nominal power (e.g., as may have been established to allow power-line communications) by the electric vehicle charger 100 to the electric vehicle 110 is terminated.

At the operation 610, having successfully validated the payload and the digital signature, the identified payment method is authorized. The payment method may be authorized using information included in the payload such as, for example, using a token as discussed above. Authorizing the payment method may include communicating with a payment network (e.g., the payment network 220) in order to authorize the payment method. For example, it may be that the controller 204 uses the communication device 202 to communicate with the payment network 220 based on the payment data included in the payload in order to authorize the payment method for payment for supplied electric power.

Subsequent to the authorizing of the method for payment for electric power, supply of electric power to the electric vehicle 110 for charging may be initiated. For example, supply may be initiated by the power supply 200 such as, for example, under control of the controller 204.

In some implementations, the data connection between the electric vehicle charger 100 and the electric vehicle 110 over the charging connection 120 and the ability to use that connection to exchange data and to process payments may also be employed to one or more other ends in addition or as an alternative to obtaining payment for electric consumed during vehicle charging as discussed above. For example, the electric vehicle charger 100 and, more specifically, potentially the controller 204, may communicate using the communication device 202 to authorize the identified payment method for payment for one or more additional products or services such as may, for example, be associated with a location of the electric vehicle charger 100.

For example, it could be that the electric vehicle 110 is tethered to the electric vehicle charger 100 during vehicle maintenance such as, for example, to maintain charge state/to charge the electric vehicle 110, potentially by way of the charging connection 120. For example, such a connection may be used to obtain data from the electric vehicle 110 for use in repair and/or maintenance thereof. In another example, such a connection may, additionally or alternatively, be used by the electric vehicle 110 to consult a remote server such as, for example, a manufacturer's server in order to obtain information related to the electric vehicle 110. In a particular example, such a connection may be employed to consult a manufacturer's remote database server such as to check for information such as, for example, special instructions related to the electric vehicle 110 (e.g., maintenance instructions), recall information for the electric vehicle 110, or the like. It could also be, additionally or alternatively, that the connection between the electric vehicle charger 100 and the electric vehicle 110 is employed to provide an invoice for vehicle maintenance/repairs to an in-vehicle computer system of the electric vehicle 110 and/or a mobile device in communication with the electric vehicle 110. The owner of the electric vehicle 110 could then pay for the invoice upon returning to the electric vehicle 110 or at some later time. In any event, it may be that such a payment is processed via the charging connection 120 (e.g., either at the dealer or in another location (e.g., at home) such as, for example, at a later point).

In another example, it could be that the electric vehicle charger 100 is a charging station provided at a hotel. A guest (who may be an owner or a renter of the electric vehicle 110) could return to the electric vehicle 110 when they are ready to leave the hotel. The guest may then initiate the check-out process, pay their bill, and receive the hotel folio with their bill payment (and potentially the other operations) being processed via the connectivity provided by the charging connection 120.

In another example, it may be that the electric vehicle 110 is tethered to the electric vehicle charger 100 in a parking area, thereby establishing the charging connection 120. So plugging-in the electric vehicle 110 may initiate payment for parking automatically, with payment information being negotiated such as, for example, in manners similar to as were discussed above. In other words, the additional product (s) or services(s) for which the payment method is authorized for payment may include parking for the electric vehicle 110. Put another way, it may be that the electric vehicle charger 100 (e.g., the controller 204) is adapted to communicate with the payment network 220 such as, for example, using the communication device 202, in order to authorize the payment method for payment for parking for the electric vehicle 110. For example, it could be that the same payment method is employed for parking as for charging. Alternatively, a user may pay manually before leaving the parking area with connectively for an electronic payment provided via the charging connection 120. Additionally or alternatively, data connectivity with a payment network or other remote server via the charging connection 120 may be used to make payment to purchase tickets related to the parking area such as, for example, movie tickets in a movie theatre parking lot, amusement park tickets in an amusement park parking lot, or train tickets in a commuter rail station parking area. Broadly put, it may be that the electric vehicle charger 100 and, potentially, more specifically, the controller 204 thereof, is adapted to communicate with the communication device 202 such as, for example, using the communication device 202, to authorize a payment method for payment for one or more additional products and/or services associated with the location of the electric vehicle charger 100.

In addition to processing charges, in some cases, the ability to process payments as discussed above may be used to process payment transactions reimbursing a user for vehicle trouble with the electric vehicle 110 such as, for example, by way of a rebate from a rental company or vehicle manufacturer.

In another example, loyalty point transactions may be processed via the charging connection 120 in addition and/or in relation to the processing of purchases.

In yet another example, data may be transferred by the electric vehicle charger 100 to a remote server via the charging connection 120 and the electric vehicle charger 100 to allow purchase of metered insurance. The electric vehicle 110 (e.g., the computing device 214) may access relevant information (e.g., mileage, average speed, etc.) such as may be employed in pricing insurance. Payment for the insurance could also be processed via the charging connection 120. In some cases, insurance for the electric vehicle 110 may be purchased incrementally/in arrears based on vehicle use since the last charging connection that provided data connectivity.

Even more broadly, the ability to establish data link over the charging connection 120 may be employed to provide connectivity to the electric vehicle 110. For example, the electric vehicle 110 may be provided with Internet connectivity over the charging connection 120 such as, for example, with the electric vehicle charger 100 acting as a gateway connecting the electric vehicle 110 to the Internet. Notably such connectivity could be used for a variety of purposes, such as, for example, to allow an occupant of the vehicle to browse the web, watch a film, shop, etc. while waiting for the electric vehicle 110 to charge.

Notably, the format of data exchange between the electric vehicle charger 100 and the electric vehicle 110 over the charging connection 120 (e.g., over one or more charging conductors thereof as discussed above) may, in various embodiments, take a variety of forms. For example, the data may be packetized. Put another way, the data sent to and received from the electric vehicle 110 by the electric vehicle charger 100 and vice-versa may include one or more data packets. Additionally or alternatively, it may be that the data exchanged includes one or more messages. For example, the exchanged data could include messages according to a payment messaging protocol.

An example communication stack as may be employed by the electric vehicle charger 100 and the electric vehicle 110 in communicating therebetween will now be discussed with reference to FIG. 7.

Figure 7:
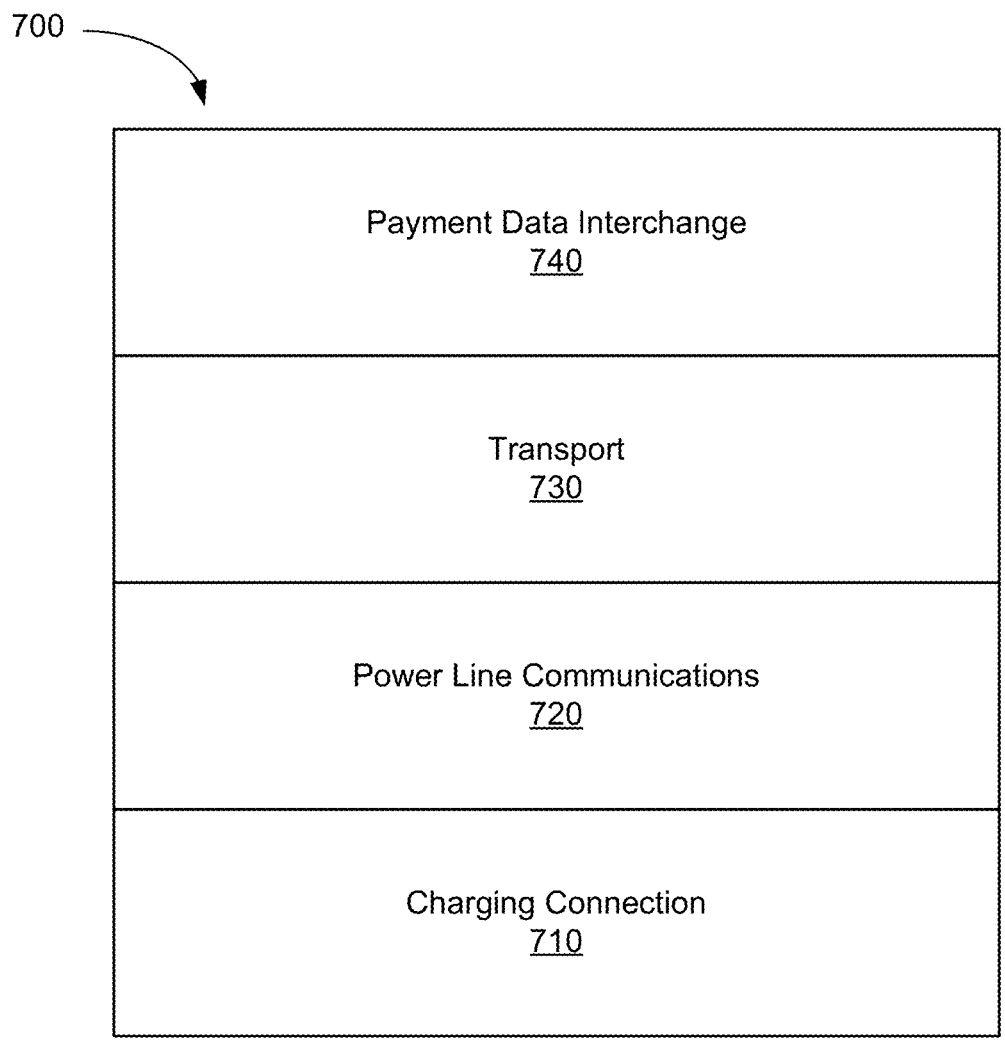
FIG. 7 shows an example communications stack as may be employed by the electric vehicle charger and the electric vehicle of FIG. 1 in communicating therebetween.

FIG. 7 illustrates an example communications stack 700. As illustrated, the example communications stack 700 includes several layers: a physical layer 710, a data link layer 720, a transport/network layer 730 and a payment data interchange layer 740.

The physical layer 710 includes of the data link layer 720 and the equipment employed in communicating thereover (e.g., the power supply 200 and the power unit 212). Notably the physical layer 710 may also specify a connector/pin-out. For example, the physical layer 710 may specify SAE J1772.

The data link layer 720 includes the signalling used over the data link layer 720. For example, the data link layer 720 may specify a power-line communications protocol such as, for example, IEEE 1901.

The transport/network layer 730 provides a transport for the data. For example, the transport/network layer 730 could include the use of TCP/IP. Furthermore, the transport/network layer 730 could rely on the use of one or more protocols atop TCP/IP. For example, the Hypertext Transport Protocol (HTTP) could be employed such as, for example, by an HTTP server executing on the power supply 200 and/or the power unit 212. In a particular example, the transport/network layer 730 may include software such as, for example, a web server. Such software may, for example, be executed by a processor of the controller 204.

The payment data interchange layer 740 provides for payment data interchange. The payment data interchange layer 740 may specify one or more standards for payment data interchange. For example, it could specify ISO 20022, ISO 8583, SWIFT MT and/or SWIFT MX. The payment data interchange layer 740 may include software for formatting and/or exchanging methods according to a specified payment data interchange standard. Such software may, for example, be executed by a processor of the controller 204.

ISO 20022 is a standard for electronic data interchange between financial institutions.

ISO 8583 is a standard for financial transaction card originated interchange messaging. Aspects of ISO 8583 are detailed in ISO 8583-1:2003 "Financial transaction card originated messages—Interchange message specifications—Part 1: Messages, data elements and code values", $1^{st}$ edition, published June 2003, available from ISO, ISO 8583-2:1998 "Financial transaction card originated messages—Interchange message specifications—Part 2: Application and registration procedures for Institution Identification Codes (IIC)", $1^{st}$ edition, published June 1998, available from ISO, and ISO 8583-3:2003 "Financial transaction card originated messages—Interchange message specifications—Part 3: Maintenance procedures for messages, data elements and code values", $1^{st}$ edition, published May 2003, available from ISO, and the contents of each of the foregoing is incorporated herein by reference in its entirety.

SWIFT is a format for messages sent on the SWIFT (Society for Worldwide Interbank Financial Telecommunication) network. SWIFT MT is the legacy message type format. SWIFT MX is a newer format based on XML.

Other data related to vehicle operation could also be transferred via the charging cable such as, for example, images of the interior of the vehicle, dashcam video etc. This may be relevant if the vehicle itself is being used for pay-per-use/rental operation such as, for example, to verify the vehicle is being operated in accordance with the rental terms and conditions and/or to verify that an authorized operator was operating the vehicle.

Notably, various of the above formats may employ and/or may be exchanged via one or more HTTP POST/GET exchanges in various formats such as, for example, using JavaScript Object Notation (JSON).

Finally, it is noted that adaptations and modification of the above-described embodiments are possible. For example, variations of each of the electric vehicle charger 100 and the electric vehicle 110 are possible.

Figure 8:
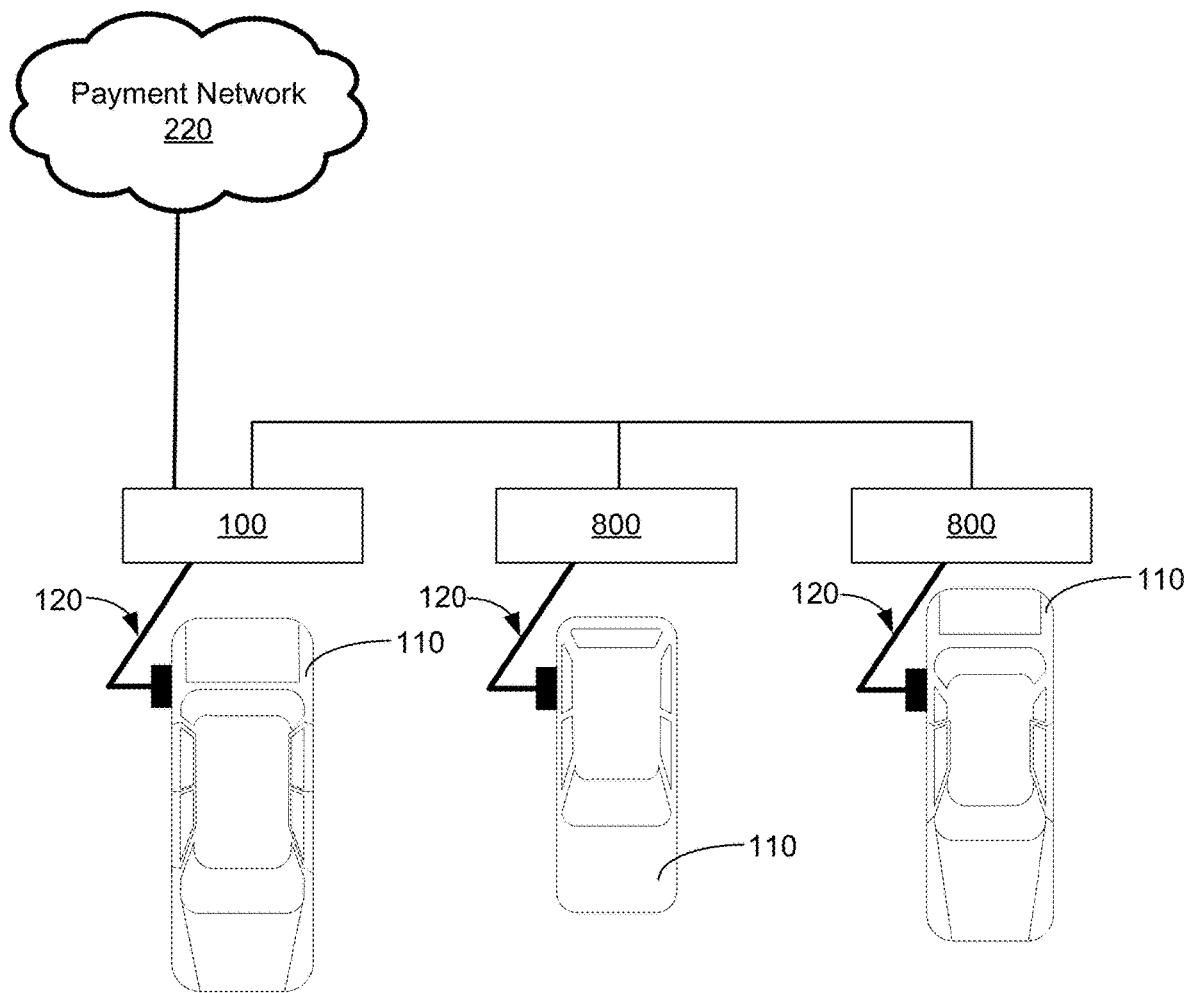
FIG. 8 shows how multiple electric vehicle chargers provided at a single location may share a single communications channel for communicating with a payment network.

An example, an example alternative electric vehicle charger will now be discussed with reference to FIG. 8.

As illustrated, various electric vehicles 110 are in communication with electric vehicle chargers via charging connections 120. In particular, one of the electric vehicles 110 is connected to the electric vehicle charger 100. The other two of the electric vehicles 110 are connected to instances of a second type of electric vehicle charger 800. The instances of the second type of electric vehicle charger 800 are in communication via a network with the electric vehicle charger 100. The instances of the second type of electric vehicle charger 800 then rely on the electric vehicle charger 100 for communication with the payment network 220. In effect, the electric vehicle charger 100 acts as a gateway for the other electric vehicle charges at a location. Conveniently, this may allow the second type of electric vehicle charger 800 to avoid having a communication device for communicating with a payment network (e.g., avoid the electric vehicle charger 800 including a communication device akin to the communication device 202) and/or may allow a location to maintain only a single connection to a payment network 220 (and to have potentially only a single instance of any ancillary equipment required for communicating with the payment network 220) while providing multiple electric vehicle chargers.

Finally, as noted above, certain adaptations and modifications of the described embodiments can be made. Therefore, the above discussed embodiments are considered to be illustrative and not restrictive.

The invention claimed is:

1. An electric vehicle charger comprising:
    a power supply for supplying electric power over a charging connection to an electric vehicle, the charging connection employing one or more charging conductors to supply electric power from the power supply to the electric vehicle for charging, the power supply adapted to send data to and receive data from the electric vehicle over the one or more charging conductors according to a power-line communications protocol;
    a communication device; and
    a controller coupled to the communication device and coupled to the power supply to control supply of electric power to the electric vehicle,
    wherein the controller is adapted to communicate with the electric vehicle over the charging connection according to the power-line communications protocol to authorize a payment method for payment for electric power supplied to the electric vehicle for charging, and
    wherein the power supply is adapted to supply a first level of electric power over at least one of one or more charging connection prior to authorization of the payment method, and to communicate over the at least one of the one or more charging connection according to the power-line communications protocol while the first level of power is being supplied,
    and wherein the power supply is adapted to supply a second level of electric power after the authorization of the payment method.

2. The electric vehicle charger of claim 1, wherein the first level of electric power is a lower power level than the second level of electric power.

3. The electric vehicle charger of claim 1, wherein the first level of electric power is insufficient for charging the electric vehicle and the second level of electric power is sufficient for charging the electric vehicle.

4. The electric vehicle charger of claim 1, wherein communicating with the electric vehicle over the charging connection includes identifying the payment method associated with the electric vehicle by:
    detecting, by the controller, that the charging connection has been established between the power supply and the electric vehicle;
    establishing, by the controller, supply of the first level of electric power; and
    communicating, using the power supply, with the electric vehicle over the charging connection according to the power-line communications protocol to identify the payment method associated with the electric vehicle.

5. The electric vehicle charger of claim 1, wherein communicating with the electric vehicle over the charging connection includes identifying the payment method associated with the electric vehicle by:
    receiving, from the electric vehicle over the charging connection, a first indication including a public key of an asymmetric cryptographic key pair associated with the payment method;
    generating a random number;
    sending, to the electric vehicle over the charging connection, a second indication including the random number;
    receiving, from the electric vehicle over the charging connection, a third indication including a payload and a digital signature for the payload, wherein the payload includes the random number and payment data, and wherein the digital signature is signed using a private key of the asymmetric cryptographic key pair associated with the payment method;
    validating a signature of the payload using the public key; and
    communicating with a payment network to authorize the payment method for payment for the electric power supplied to the electric vehicle by communicating, based on the payment data, with the payment network using the communication device to authorize the payment method,
    and wherein the controller is further adapted to initiate supply of the second level of electric power subsequent to authorizing the payment method for payment for the electric power.

6. The electric vehicle charger of claim 1, wherein authorizing the payment method includes obtaining an authorization to charge the payment method up to a pre-defined amount and wherein the controller is further adapted to charge for supplied electric against the authorization.

7. The electric vehicle charger of claim 1, wherein data sent to and received from the electric vehicle over the charging connector includes one or more data packets.

8. The electric vehicle charger of claim 1, wherein sending data to and receiving data from the electric vehicle over the one or more charging conductors according to the power-line communications protocol employs orthogonal frequency-division multiplexing to modulate the data.

9. The electric vehicle charger of claim 1, wherein the controller is further adapted to communicate with a payment network using the communication device to authorize the payment method for payment for at least one additional product or service associated with a location of the electric vehicle charger.

10. The electric vehicle charger of claim 9, wherein the at least one additional product or service includes parking for the electric vehicle.

11. The electric vehicle charger of claim 1, wherein data exchanged with the electric vehicle over the at least one charging conductor is packetized.

12. A method of charging an electric vehicle comprising:
    detecting that a charging connection has been established between an electric vehicle and an electric vehicle charger;
    by the electric vehicle charger, without initiating supply of electric power to the electric vehicle for charging:
        establishing supply of a first level of electric power over the charging connection to allow communication between the electric vehicle charger and the electric vehicle according to a power-line communications protocol;
        communicating with the electric vehicle over the charging connection according to the power-line communications protocol;

authorizing a payment method for payment for electric power supplied by the electric vehicle charger to the electric vehicle for charging; and following authorization of payment using the payment method, initiating supply of a second level or electric power by the electric vehicle charger to the electric vehicle.

13. The method of claim 12, wherein the first level of electric power is a lower power level than the second level of electric power.

14. The method of claim 12, wherein the first level of electric power is insufficient for charging the electric vehicle and the second level of electric power is sufficient for charging the electric vehicle.

15. The method of claim 12, wherein communicating with the electric vehicle over the charging connection includes identifying the payment method associated with the electric vehicle by:

receiving, from the electric vehicle over the charging connection, a first indication including a public key of an asymmetric cryptographic key pair associated with the payment method;

generating a random number;

sending, to the electric vehicle over the charging connection, a second indication including the random number;

receiving, from the electric vehicle over the charging connection, a third indication including a payload and a digital signature for the payload, wherein the payload includes the random number and payment data, and wherein the digital signature is signed using a private key of the asymmetric cryptographic key pair associated with the payment method;

validating the signature of the payload using the public key; and communicating with the payment network to authorize the payment method for payment for supplied electric power by communicating, based on the payment data, with the payment network to authorize the payment method for supplied electric power, and wherein the method further comprises:

subsequent to authorizing the payment method for payment for the electric power, initiating the supply of the second level of electric power to the electric vehicle.

16. The method of claim 12, wherein authorizing the payment method for payment for electric power supplied to the electric vehicle includes obtaining an authorization to charge the payment method up to a pre-defined amount and wherein payment for supplied electric power is processed against the authorization.

17. The method of claim 12, wherein authorizing the payment method includes obtaining an authorization to charge the payment method for an incremental amount of power, the method further comprising:

after supplying the incremental amount of power to the electric vehicle, communicating, with the payment network, to obtain a further authorization to charge the payment method for a further incremental amount of power.

18. The method of claim 17, further comprising:

obtaining a yet further authorization to charge the payment method for a yet further incremental amount of power;

receiving an indication that the yet further authorization was declined; and following receipt of the indication that the yet further authorization was declined, terminating supply of the second level of electric power by the electric vehicle charger to the electric vehicle.

19. The method of claim 12, further comprising:

communicating, by the electric vehicle charger, with a payment network to authorize the payment method for payment for at least one product or service associated with a location of the electric vehicle charger.

20. The method of claim 19, wherein the at least one product or service includes parking for the electric vehicle.

* * * * *